Patented May 2, 1933

1,906,474

UNITED STATES PATENT OFFICE

MAURICE L. MACHT, OF NORTH ARLINGTON, NEW JERSEY, ASSIGNOR TO DUPLATE CORPORATION, A CORPORATION OF DELAWARE

COMPOSITE GLASS

No Drawing.   Application filed September 25, 1930. Serial No. 484,468.

The invention relates to composite glass which ordinarily consists of two sheets of glass and an interposed sheet of cellulose ester plastic, such as celluloid cemented together. The object of this invention is to provide an improved article and method of making the same. Among the various cements heretofore employed for securing the glass and celluloid together are various forms of pyroxylin varnishes or cements, and various resins. These forms of cement have in general certain favorable characteristics, one of which is that the sheets will not separate due to the absorption of moisture by the cement, but have certain undesirable properties, one of the difficulties with the resins being their tendency to polymerize and become brittle and lose their holding power in the course of time. The object of the present invention is to overcome the objections incident to the pyroxylin and resin cements as heretofore used and combine the advantages of such cements. I have found that mixtures of hard resins and pyroxylin are unsatisfactory, but that placing a soft resin in solution with pyroxylin in a common solvent achieves the desired result, giving a cement (1) which will not become brittle and lose its holding effect on long exposure to light, (2) which is not absorptive of moisture and which, therefore, requires no sealing around the edges of the composite plate to prevent separation, (3) which does not discolor after long exposure to light, (4) which has a resistance and holding power comparable to gelatin and casein cements, and (5) which can be used in compositing the sheets with the expenditure of a minimum amount of time and labor and requiring the use of only standard compositing apparatus.

In general, any soft resin that is compatible with pyroxylin, though not necessarily having plasticizing or solvent action on the pyroxylin, may be put into solution with any type of pyroxylin having a common solvent mixture. The term "resin" includes the balsams, although much better results are secured with synthetic resins. The term "soft resins" means those which are plastic in the hands at ordinary room temperatures and includes those which are more or less fluid in character, like Canada balsam. The ratio of resin to pyroxylin may be varied between wide limits dependent on the nature of the resin used. I prefer to use a resin of the soft, synthetic type, such as soft glyptal resin or other polyhydric alcohol-dibasic acid condensation product in which 30 to 60 per cent of oil, such as hydrogenated cotton seed oil, or fat, such as beta fat, or other glycerol ester of a fatty acid has been incorporated. In this connection, the simple addition of fat or oil to the synthetic resin is not satisfactory, but it is necessary to polymerize the resin in the presence of the oil or fat in order to obtain the best results for safety glass purposes. Other soft resins which may be employed with the pyroxylin in place of the glyptal or Canada balsam in a common solvent are balsam tolu, gum elemi, gum thus, vinyl resins, toluene sulfonamide derivatives, and diphenyl derivatives.

The following formulae are typical of the type of cements that may be prepared, though I do not wish to limit myself to the proportions or to the specific solvent mixtures mentioned, for they may be varied very widely dependent on a number of conditions. In general a ratio of 2 parts of plasticizer to 1 part of pyroxylin, or 2 parts of resin to 2 parts of plasticizer to 1 part of pyroxylin, has been found desirable.

| I | | II | |
|---|---|---|---|
| | Percent | | Percent |
| Pyroxylin | 3.5 | Pyroxylin | 3.5 |
| Resin | 7.0 | Resin | 7.0 |
| Ethyl acetate | 35.5 | Plasticizer | 7.0 |
| Diacetone alcohol | 14.0 | Ethyl acetate | 32.0 |
| Toluol | 40.0 | Diacetone alcohol | 12.0 |
| | | Toluol | 38.5 |

I have found that other cellulose esters or ethers may be used to replace nitro cellulose in this adhesive composition. A typical formula for such a composition is as follows:

| | Percent |
|---|---|
| Cellulose acetate | 4 |
| Resin | 8 |
| Acetone | 25 |
| Ethylene dichloride | 13 |
| Methyl cellosolve | 35 |
| Ethyl lactate | 15 |

In practicing the process using any of the mixtures above disclosed, the mixture is sprayed onto the faces of the glass sheets which are to go next to the plastic sheet in a thin film or coating. In the use of those formulæ which do or do not contain plasticizers, the films may be dried until they are entirely free from solvent, after which the sheets are placed together and heat and pressure are applied, preferably about 240 degrees F. and a pressure of about 150 pounds per square inch.

What I claim is:

1. A composite plate comprising a pair of glass sheets, an interposed sheet of cellulose ester plastic and a joining layer of material between each of the glass sheets and the sheet of plastic consisting of a mixture of soft, synthetic resin with glycerol ester of a fatty acid incorporated therein, a pyroxylin plasticizer and pyroxylin.

2. A composite plate comprising a pair of glass sheets, an interposed sheet of cellulose ester plastic and a joining layer of material between each of the glass sheets and the sheet of plastic consisting of a mixture of soft, synthetic resin polymerized in the presence of glycerol ester of a fatty acid, a pyroxylin plasticizer and pyroxylin.

3. A process of making a composite plate of glass sheets and an interposed cellulose ester plastic sheet, which consists in applying a layer of soft, glyptal resin polymerized in the presence of oil or fat and pyroxylin in solution in a common solvent to the faces of the sheets which are to be joined, assembling the sheets and applying heat and pressure thereto.

4. A composite plate comprising a pair of glass sheets, an interposed sheet of cellulose ester plastic and a joining layer of material between each of the glass sheets and the sheet of plastic consisting of a mixture of a soft polyhydric alcohol polybasic acid condensation resin polymerized in the presence of glycerol ester of a fatty acid and pyroxylin.

5. A composite plate comprising a pair of glass sheets, an interposed layer of cellulose ester plastic, and a joining layer of material between each of the glass sheets and the sheet of plastic consisting of cellulose ester plastic mixed with a plasticizer and with a soft polyhydric alcohol polybasic acid condensation resin polymerized in the presence of glycerol ester of a fatty acid.

In testimony whereof, I have hereunto subscribed my name this 8th day of September, 1930.

MAURICE L. MACHT.